United States Patent
Gierth et al.

[15] 3,691,145
[45] Sept. 12, 1972

[54] PRODUCTION OF POLYETHYLENE BY THE HIGH PRESSURE PROCESS USING A MIXTURE OF TERTIARY BUTYL HYDROPEROXIDE AND OXYGEN AS THE INITIATOR

[72] Inventors: Volker Gierth; Hans Gropper; Franc Georg Mietzner, all of Ludwigshafen; Friedrich Urban, Limburgerhof, all of Germany

[73] Assignee: Badische Anilin- & Soda-Fabrik Aktiengesellschaft, Ludwigshafen/Rhine, Germany

[22] Filed: Aug. 6, 1970

[21] Appl. No.: 61,832

[52] U.S. Cl. ............................................. 260/94.9 R
[51] Int. Cl. .............................. C08f 1/60, C08f 3/04
[58] Field of Search .................................. 260/94.9 R

[56] References Cited

FOREIGN PATENTS OR APPLICATIONS 870,043    6/1961    Great Britain ........ 260/94.9 R

*Primary Examiner*—Joseph L. Schofer
*Assistant Examiner*—A. Holler
*Attorney*—Johnston, Root, O'Keeffe, Keil, Thompson & Shurtleff

[57] ABSTRACT

Production of polyethylene by polymerizing ethylene at elevated temperatures and elevated pressure under the action of a polymerization initiator, consisting of oxygen and t-butyl hydroperoxide, and of a polymerization regulator. The process of the invention is characterized in that temperature ranging from 310° to 400°C are used and that the polymerization initiator consists of from 1 to 12 molar parts of oxygen and from 1 to 5 molar parts of t-butyl hydroperoxide per million molar parts of the ethylene being polymerized. The process of the invention is preferably carried out continuously in a tubular reactor. The process permits easy control of the reaction with high yields and provides products with high flexibility and elongation.

5 Claims, No Drawings

PRODUCTION OF POLYETHYLENE BY THE HIGH PRESSURE PROCESS USING A MIXTURE OF TERTIARY BUTYL HYDROPEROXIDE AND OXYGEN AS THE INITIATOR

The present invention relates to a process for the production of polyethylenes wherein ethylene is polymerized at elevated temperatures and pressures of from 1,500 to 6,000 atmospheres under the action of a polymerization initiator, consisting of oxygen and t-butyl hydroperoxide, and of a polymerization regulator.

A known process of this kind is described in U.K. Patent 870,043. It shows a number of advantages over other processes of a comparable nature. For example, the polymerization reaction is more easily kept under control and provides higher yields. However, one drawback of the known process is that its products show relatively poor flexibility and elongation, with the result that films made from the said products, for example, tend to tear relatively easily. The known process is characterized in that relatively low temperatures (ranging from 160° to 250° C and in particular from 170° to 200°C) are used and that relatively large quantities of polymerization initiator are employed (from 25 to 600 molar parts and in particular from 50 to 150 molar parts per million molar parts of the ethylene being polymerized, of which from 20 to 500, in particular from 20 to 135 molar parts are oxygen and from 1 to 100, in particular from 2 to 15 molar parts are t-butyl hydroperoxide).

It is an object of the present invention to provide a process of the kind defined above which shows the aforementioned advantages but which suffers from the aforementioned disadvantages not at all or to considerably lesser degree.

We have found that, surprisingly, this object is achieved by operating at relatively high temperatures—contrary to the prejudice given by U.K. Patent 870,043 (poor controllability of the process; risk of decomposition)—and by using relatively small amounts of polymerization initiator.

Thus the present invention relates to a process for the production of polyethylene wherein ethylene is polymerized at elevated temperatures and pressures of from 1,500 to 6,000 atmospheres under the action of a polymerization initiator, consisting of oxygen and t-butyl hydroperoxide, and of a polymerization regulator. The process of the invention is characterized in that a temperature of from 310° to 400°C, preferably from 330° to 370°C, is used and that the polymerization initiator consists of from 1 to 12 and preferably from 3 to 9 molar parts of oxygen and from 1 to 5 and preferably from 2 to 4 molar parts of t-butyl hydroperoxide per million molar parts of the ethylene being polymerized.

The process may be carried out in the usual apparatus and by the usual methods suitable for the polymerization of ethylene at elevated pressures and temperatures. Instead of giving details thereon in this specification reference is made to Ullmann's Encyklopädie der technischen Chemie, Vol. 14, 3rd Edition (Munich-Berlin 1963), the chapter entitled "Polyäthylen" on pp. 137–148 and to Lyle F. Albright: "High-Pressure Processes for Polymerizing Ethylene," Chemical Engineering, Vol. 73 (1966), Number issued on Dec. 19, pp. 113–120, by way of example.

We have found that the process of the invention may be continuously carried out in tubular reactors with particular success.

The following points should be observed regarding the materials used in the process of the invention:

a. the ethylene should show the usual degree of purity, that is a purity of at least 99 percent v/v;

b. the oxygen may conveniently be used in the form of air, for purely economical reasons; the t-butyl hydroperoxide my conveniently be used in the form of solutions (0.01 to 1, preferably 0.05 to 0.1 molar) in inert organic liquids or organic liquids acting as polymerization regulators, such as hydrocarbons, esters, ethers, ketones or mixtures thereof;

c. the polymerization regulators used may be those usual in the art, such as alkanes, alkenes of more than two carbon atoms, alcohols, ethers, aldehydes, esters, ketones or mixtures of such substances. The amount of regulator used may also be that usual in the art, bearing in mind, if necessary, that the organic liquid in which the t-butyl hydroperoxide is dissolved itself acts as polymerization regulator. With regard to the amount of polymerization regulator to be used it will be appreciated that no general statement of absolute values can be made due to the great variations depending on the strength of the regulator and the other conditions of the process. On the question of regulators in the present context see G. A. Mortimer, Journal of Polymer Science, A 1, 4, 1966, No. 4, pp. 881–900.

The polymerization apparatus used in operating the following Examples is a tubular reactor such as is usual in continuous high-pressure polymerization of ethylene. In the reactor the ratio of the diameter of the tube to its length is 1:14,000. The reaction tube is surrounded by a jacket tube containing a heat-transfer medium. The jacket tube is in turn divided into two independently controllable zones, of which the first extends over two-fifths of the length of the tube (zone I) and the second over the remaining three-fifths of the length of the tube (ZONE II).

At the end of the reaction tube there is a valve which serves both to regulate the pressure in the polymerization chamber and to discharge the reaction product. The valve is followed by a conventional high-pressure separator and a conventional low-pressure separator for the separation of the resulting polymer from the non-polymerized materials, i.e., mainly from the portions of ethylene not having undergone polymerization.

The polyethylene obtained by this process is especially useful for the production of transparent film.

EXAMPLE 1

There is charged to the reactor at its feed end a mixture compressed to 2,300 atmospheres and consisting of 1,000,000 parts by weight per hour of ethylene, 4.7 parts by weight per hour of air (equivalent to 8.0 molar parts of oxygen per million molar parts of the ethylene being polymerized), 1,240 parts by weight per hour of a 0.05 molar solution of t-butyl hydroperoxide in cyclohexane (equivalent to 2.3 molar parts per million molar parts of the ethylene being polymerized) and 2,100 parts by weight per hour of methyl ethyl ketone (polymerization regulator). In zone I of the reactor jacket the heat-transfer medium is maintained at a constant temperature of 210°C and in zone II at 220°C.

The released heat of reaction thus brings the temperature of the reaction mixture up to 360°C.

There are thus obtained 230,000 parts by weight per hour of a polyethylene having the following characteristics: melt index (ASTM–D) 1238) 3.9 g/10 min.; density (DIN 53,479/7.2) 0.9201 g/cm.³.

EXAMPLE 2

There is charged to the feed end of the reactor a mixture compressed to 2,300 atmospheres and consisting of 1,000,000 parts by weight per hour of ethylene, 4.1 parts by weight per hour of air (equivalent to 7.1 molar parts of oxygen per million molar parts of the ethylene being polymerized), 1,670 parts by weight per hour of a 0.05 molar solution of t-butyl hydroperoxide in cyclohexane (equivalent to 3.1 molar parts per million of the ethylene being polymerized) and 2,400 parts by weight per hour of propylene (polymerization regulator). In zone I of the reaction jacket the heat transfer medium is maintained at a constant temperature of 210°C, in zone II at 220°C, with the result that the temperature of the reaction mixture reaches 355°C due to the released heat of reaction.

There are thus obtained 226,000 parts by weight per hour of a polyethylene having the following characteristics: melt index (ASTM–D 1238) 3.9 g/10 min.; density (DIN 53,479/7.2) 0.9190 g/cm³.

EXAMPLE 3

There is charged to the feed and of the reactor a mixture compressed to 2,300 atmospheres and consisting of 1,000,000 parts by weight per hour of ethylene, 6.9 parts by weight per hour of air (equivalent to 12 molar parts of oxygen per million molar parts of the ethylene being polymerized), 1,025 parts by weight per hour of a 0.05 molar solution of t-butyl hydroperoxide in cyclohexane (equivalent to 1.9 molar parts per million parts of the ethylene being polymerized) and 2,900 parts by weight per hour of methyl ethyl ketone (polymerization regulator).

In zone I of the regulator jacket the heat transfer medium is maintained at a constant temperature of 200°C, in zone II at 200°C, with the result that the temperature of the reaction mixture reaches 310°C due to the released heat of reaction.

There are thus obtained 195,000 parts by weight per hour of a polyethylene of the following characteristics: melt index (ASTM–D 1238) 3.8 g/10 min; density (DIN 53,479/7.2) 0.9220 g/cm³.

COMPARATIVE EXAMPLE

The procedure described above is followed except that the 6.9 parts by weight per hour of air are replaced by 11.4 parts by weight per hour of air (equivalent to 20 molar parts of oxygen per million parts of the ethylene being polymerized) and that in zone I of the reactor jacket the heat transfer medium is maintained at a constant temperature of 175°C, in zone II at 185°C. (The reaction mixture thus reaches a temperature of 250°C due to the released heat of reaction).

There are thus obtained 150,000 parts by weight per hour of a polyethylene of the following characteristics: melt index (ASTM–D 1238) 3.8 g/10 min.; density (DIN 53,479/7.2) 0.9313 g/cm³.

The physical tests on the product of Example 3 show that this product has 22 percent better flexibility and 290 percent better elongation than the product of the Comparative Example.

We claim:

1. In a process for the production of homopolymers of ethylene by polymerization of ethylene at a pressure of from 1,500 to 6,000 atmospheres in the presence of a polymerization regulator, the improvement which comprises carrying out the polymerization at a temperature of from 310° to 400°C in the polymerization initiator consisting essentially of a mixture of 1 to 12 molar parts of oxygen and from 1 to 5 molar parts of tertiary butyl hydroperoxide, both per million molar parts of the ethylene being polymerized.

2. A process as in claim 1 which is continuously carried out in a tubular reactor.

3. A process as in claim 1 wherein said temperature range is from 330° to 370°C.

4. A process as in claim 3 wherein the amount of oxygen is from 3 to 12 molar parts.

5. A process as in claim 4 wherein the amount of tertiary butyl hydroperoxide is from 2 to 4 molar parts.

* * * * *

PO-1050
(5/69)

UNITED STATES PATENT OFFICE
CERTIFICATE OF CORRECTION

Patent No. 3,691,145                     Dated September 12, 1972

Inventor(s) Gierth et al

It is certified that error appears in the above-identified patent and that said Letters Patent are hereby corrected as shown below:

Cover page, left hand column, insert
-- [30] Foreign Application Priority Data
      Aug. 9, 1969.... Germany.....P 19 40 689.4 --

Signed and sealed this 13th day of February 1973.

(SEAL)
Attest:

EDWARD M. FLETCHER, JR.　　　　　　　　　　ROBERT GOTTSCHALK
Attesting Officer　　　　　　　　　　　　　Commissioner of Patents